United States Patent Office 2,712,515
Patented July 5, 1955

2,712,515

PROCESS FOR SEPARATING VITAMIN A PALMITATE

Ralph H. Beutel, Newark, N. J., assignor to Merck & Co., Inc., Rahway, N. J., a corporation of New Jersey No Drawing. Application July 22, 1952, Serial No. 300,360

10 Claims. (Cl. 167—81)

This invention relates to the treatment of vitamin A esters to remove contaminants therefrom and effect a substantially quantitative recovery of vitamin A esters. More particularly, the invention relates to procedures for employing anion exchangers in the treatment of vitamin A esters to effect removal of acid contaminants.

The esters of vitamin A may be prepared by esterifying crystalline vitamin A with the appropriate acid halide. Varying amounts of the acid and acid anhydride are present in the starting material, and additional amounts are formed during the acylation procedure. It is often desirable to remove these acid contaminants from the vitamin A ester.

For example, the reaction of vitamin A with palmityl chloride to form vitamin A palmitate and the removal of palmitic acid from the vitamin A palmitate is disclosed in the Journal of the American Chemical Society 64: 2407–2410 (1942). The process for the removal of the acid contaminant involves dissolving the impure vitamin A palmitate in propylene oxide and cooling the solution to temperatures of about −80° C. until such time as the palmitic acid crystallizes from solution and precipitates. The palmitic acid is then removed by filtration at low temperatures, a process inherently troublesome. Cooling the reaction mixture to low temperatures also causes crystallization of some vitamin A palmitate, which is removed by filtration, and consequently decreases the final yield of the desired product. This procedure results in vitamin A palmitate containing about 2.0% palmitic acid.

In accordance with known procedures, it was impracticable to prepare vitamin A palmitate containing less than 2% palmitic acid and palmitic anhydride although a much lower concentration was desired. When pharmaceutical preparations of vitamin A palmitate containing more than 2% of combined palmitic acid and palmitic anhydride are stored in a refrigerator for extended periods of time, the pharmaceutical solution becomes turbid and the palmitic acid precipitates from solution.

It is an object of my invention to greatly shorten and simplify the removal of acid contaminants from vitamin A esters, and also furnish a method for decreasing the acid content to substantially 0.5% or less.

It is a further object of my invention to provide a method for effecting the removal of the acid contaminants from vitamin A esters which method avoids the crystallization and precipitation of the acid contaminants by cooling, and then removing these impurities by cold filtration. My novel process also makes possible the removal of the acid contaminants with no appreciable loss of vitamin A ester.

Regarded in certain of its broader aspects, my invention resides in new procedures for the purification of vitamin A esters which comprise contacting a solution of a vitamin A ester and contaminants with an anion exchanger on the hydroxyl cycle and separating the resulting adsorbate from residual solution, thereby effecting a removal of contaminants in the adsorbate.

In carrying out my new purification procedures, I can start with an organic solvent solution of a vitamin A ester obtained by dissolving the impure vitamin A ester in a suitable organic solvent. I can also employ as a starting material, the reaction mixture obtained by acylating vitamin A alcohol.

Suitable solvents employed in my novel process include all of the inert organic solvents in which the vitamin A ester is soluble with the exception of hydroxylated solvents, such as ethanol. Ethyl ether, ethyl acetate, benzene, acetone, methylene chloride and n-hexane are some of the solvents which have been successfully employed in my process.

The anion exchangers which I find most effective in these procedures are the organic nitrogenous anion exchangers which derive their exchange capacity essentially from quaternary ammonium groups and which are generally referred to as strongly basic anion exchange resins. These resins may, of course, contain other active exchange groups such as primary, secondary, and tertiary amine groups, guanidine groups, and the like. In addition to the basicity of the resin, it is important that the resin be of a relatively porous structure, and in selecting a resin for use in the process both basicity and porosity should be considered. Maximum adsorption and purification of vitamin A ester is obtained with strongly basic and highly porous exchange resins, while satisfactory but somewhat less efficient results are obtained with strongly basic resins of lower porosity and with less strongly basic resins having high porosity. Thus, in carrying out my invention, resins which are considered practical for use in my new procedures are the moderately to strongly basic and moderately to highly porous anion exchange resins.

A number of anion exchange resins which can be effectively employed in my process are commercially available. These include, for example, the strongly basic and highly porous anion exchange resins "Amberlite XE–98" (product of Rohm & Haas Company) and the strongly basic and moderately porous anion exchange resin "Amberlite IRA–400" (product of Rohm & Haas Company).

The resin is converted to the hydroxyl cycle for use in removing the aliphatic acid and aliphatic acid anhydride from vitamin A ester by washing or contacting the resin with an aqueous solution of an inorganic base. The resin after conversion to the hydroxyl cycle is washed with water to remove the excess base. If the resin is then washed with alcohol to remove surface water, the exchange efficiency is increased slightly. However, the presence of surface water does not prevent the successful use of the resins. The conversion of the resin to the hydroxyl cycle may be carried out either batchwise or columnwise with equal success.

In accordance with a preferred embodiment of my invention I have found that an n-hexane solution of vitamin A palmitate may be prepared by reacting palmityl chloride in pyridine with vitamin A alcohol in n-hexane. The pyridine and pyridine hydrochloride are removed by washing with water, then with dilute hydrochloric acid and finally with a sodium carbonate solution. An n-hexane solution of vitamin A palmitate is thus obtained. I have found that n-hexane is the most efficient of the operative solvents since its use permits a shorter contact time and greater removal of palmitic acid. The n-hexane solution of vitamin A palmitate is contacted with an anion exchange resin of the quaternary ammonium salt type, such as Amberlite IRA–400 or Amberlite XE–98, the resin having been previously put on the hydroxyl cycle by treatment with sodium hydroxide. Contact between the resin and the solution of vitamin A palmitate may be effected by a batchwise procedure or a resin column may be used. The preferred method is to use a batch procedure because contact time of from three to sixteen hours between the resin and solution is usually required. The contact time varies with the amount of contaminant to be removed, the solvent employed, and the nature of the particular resin used, said resins having slightly variable porosity and structure. This causes the rate and degree of removal of palmitic acid to vary. In the preferred batchwise procedure it is necessary that the solution be stirred vigorously after addition of the resin so that there be maximum contact between the resin and the contaminents to be removed; namely, palmitic acid and palmitic anhydride. The resin upon which the contaminants are adsorbed and the residual solution of vitamin A palmitate freed of palmitic acid and palmitic anhydride are separated. The resin is then washed with n-hexane to remove any vitamin A palmitate which may have been adsorbed thereon. Washing of the resin is continued until the filtrate is obtained free of the characteristic vitamin A palmitate yellow color. The purified n-hexane solution of vitamin A palmitate is then evaporated to dryness in vacuo or it may be treated with resin again to remove any remaining palmitic acid or palmitic anhydride not removed by the first anion resin treatment. It has been found that the palmitic acid content can be reduced by this process in one step to a maximum content of 0.5% and is generally reduced to about 0.1% and less; the result depending upon the resin and other variable factors already mentioned.

The following examples illustrate methods of carrying out the present invention, but it is to be understood that these examples are given primarily by way of illustration and not of limitation.

*Example 1*

Amberlite XE-98 was washed with aqueous sodium hydroxide solution to place the resin on the hydroxyl cycle. The resin can be stored under water until ready for use. When the resin was to be used, the water was removed by filtration and the resin washed with alcohol to remove surface water, and finally with n-hexane to remove alcohol.

Palmityl chloride was added to a solution of vitamin A alcohol in n-hexane and pyridine. After the removal of the pyridine and pyridine hydrochloride, eighteen liters of n-hexane containing 2671.0 grams of vitamin A palmitate and eighty grams (3%) of palmitic acid and palmitic anhydride thus formed, was stirred with 480 grams of the above Amberlite XE-98 on the hydroxyl cycle. The reaction mixture was filtered and the resin was washed with n-hexane until the wash was just free of color. Excessive washing elutes palmitic acid. The combined filtrate and wash was then concentrated and evaporated in vacuo to dryness. The recovery of vitamin A palmitate was quantitative and contained 0.45% palmitic acid.

*Example 2*

Amberlite XE-98 and Amberlite IRA-400 were individually washed with an aqueous sodium hydroxide solution. The resins, after conversion to the hydroxyl cycle, were washed with water to remove excess sodium hydroxide and washed with alcohol to remove any surface water from the resin. A final wash of n-hexane was used to remove alcohol.

n-Hexane solutions of vitamin A palmitate containing free palmitic acid were contacted with the strong anion exchange resins Amberlite IRA-400 and Amberlite XE-98, prepared on the hydroxyl cycle as above. Six parts of resin to one part palmitic acid was used. The results are as follows:

| Resin | Contact time, hours | Percent Palmitic Acid Initial | Percent Palmitic Acid Final |
|---|---|---|---|
| XE-98 | 4 | 3.1 | 0.049 |
| XE-98 | 6 | 3.1 | 0.03 |
| IRA-400 | 4 | 2.6 | 0.106 |
| IRA-400 | 4 | 2.73 | 0.46 |
| IRA-400 | 4 | 3.0 | 0.03 |
| IRA-400 | 15 | 2.6 | 0.035 |
| IRA-400 | 16½ | 6.25 | 0.128 |
| IRA-400 | 19 | 2.73 | 0.12 |

Thus, it appears that either of these resins may be successfully used and that a contact time of six hours is usually sufficient under these conditions. Slightly variable results may be obtained because resin porosity varies slightly from batch to batch.

*Example 3*

Samples of solutions of vitamin A palmitate containing 3.1% palmitic acid in n-hexane were contacted with Amberlite IRA-400 resin prepared on the hydroxyl cycle as described above, by stirring for various periods of time. Six parts resin to one part palmitic acid was used. The decrease in palmitic acid content with increased contact time is shown by the following results:

| Contact (stirring) time in hours | Percent Palmitic acid in Vitamin A palmitate after treatment |
|---|---|
| 1 | 0.248 |
| 2 | 0.174 |
| 4 | 0.099 |
| 6 | 0.039 |

*Example 4*

Solutions of vitamin A palmitate containing 2.73% palmitic acid were prepared and contacted for a period of six hours with Amberlite IRA-400 resin on the hydroxyl cycle. Six parts of Amberlite resin to one part palmitic acid to be removed was employed. Results were as follows:

| Solvent | Palmitic Acid Content, Percent |
|---|---|
| 1. n-Hexane | 0.35 |
| 2. Benzene | 0.48 |
| 3. Methylene chloride | 0.50 |
| 4. Acetone | 0.80 |
| 5. Ethyl ether | 1.0 |
| 6. Ethyl acetate | 1.7 |
| 7. Ethanol, absolute | 2.7 |

Modifications may be made in carrying out the present invention without departing from the spirit and scope thereof and the invention is to be limited only by the appended claims.

I claim:
1. The process for separating vitamin A palmitate from contaminants asscociated therewith that comprises contacting a solution of vitamin A palmitate in a solvent selected from the group consisting of n-hexane, benzene, methylene chloride, acetone, and ethyl ether with an anion exchange resin on the hydroxyl cycle and separating the resin adsorbate from the residual solution, thereby effecting removal of the contaminants in the adsorbate.

2. The process as defined in claim 1 wherein the anion exchange resin employed is a moderately to strongly basic, and moderately to highly porous anion exchange resin.

3. The process as defined in claim 1 wherein the anion exchange resin employed is a strongly basic and highly porous anion exchange resin.

4. The process as defined in claim 1 wherein the anion exchange resin employed is an anion exchange resin which derives its exchange capacity essentially from quaternary ammonium groups.

5. The process as defined in claim 1 wherein the hydroxyl ion is furnished by pretreatment of the resin to convert the resin to the hydroxyl form.

6. The process for separating vitamin A palmitate from the contaminants, palmitic acid and palmitic anhydride, associated therewith that comprises contacting an n-hexane solution of the vitamin A ester and contaminants with an anion exchange resin on the hydroxyl cycle and separating the resin adsorbate from the residual solution, thereby effecting removal of contaminants in the adsorbate.

7. The process for separating vitamin A palmitate from the contaminants, palmitic acid and palmitic anhydride, associated therewith that comprises contacting a benzene solution of the vitamin A ester and contaminants with an anion exchange resin on the hydroxyl cycle and separating the resin adsorbate from the residual solution, thereby effecting removal of contaminants in the adsorbate.

8. The process for separating vitamin A palmitate from the contaminants, palmitic acid and palmitic anhydride, associated therewith that comprises contacting a methylene chloride solution of the vitamin A ester and contaminants with an anion exchange resin on the hydroxyl cycle and separating the resin adsorbate from the residual solution, thereby effecting removal of contaminants in the adsorbate.

9. The process for separating vitamin A palmitate from the contaminants, palmitic acid and palmitic anhydride, associated therewith that comprises contacting an acetone solution of the vitamin A ester and contaminants with an anion exchange resin on the hydroxyl cycle and separating the resin adsorbate from the residual solution, thereby effecting removal of contaminants in the adsorbate.

10. The process for separating vitamin A palmitate from the contaminants, palmitic acid and palmitic anhydride, associated therewith that comprises contacting an ethyl ether solution of the vitamin A ester and contaminants with an anion exchange resin on the hydroxyl cycle and separating the resin adsorbate from the residual solution, thereby effecting removal of contaminants in the adsorbate.

References Cited in the file of this patent

UNITED STATES PATENTS

| | | |
|---|---|---|
| 2,249,525 | Hickman | July 15, 1941 |
| 2,604,482 | Austerweil | July 22, 1952 |

OTHER REFERENCES

Journal of the American Chemical Society, vol. 64, pp. 2407 to 2410 (1942).